June 22, 1943.   A. C. RUGE   2,322,319
STRAIN RESPONSIVE APPARATUS
Original Filed Sept. 16, 1939

INVENTOR
Arthur C. Ruge
By ................
Attorney

Patented June 22, 1943

2,322,319

UNITED STATES PATENT OFFICE 2,322,319

STRAIN RESPONSIVE APPARATUS

Arthur C. Ruge, Cambridge, Mass.

Original application September 16, 1939, Serial No. 295,207. Divided and this application July 15, 1942, Serial No. 451,063

7 Claims. (Cl. 201—63)

This invention relates generally to strain responsive apparatus and more particularly to an improved temperature compensated electrical strain sensitive gauge for determining the strain (deformation) of a specimen or other member subjected to stress (load).

This application is a division of my copending application Serial No. 295,207, filed September 16, 1939, and my improved strain measuring means, specifically shown as a strain gauge, embodies the principle that the electrical resistance of materials varies in response to strain thereof. In my gauge the material is in the form of a fine wire filament preferably of the order of approximately .001" diameter, although various other diameters and various types of materials may be used as well as a variety of cementing agents, all as disclosed in said copending application. I bond such a filament throughout its effective length to the surface of a test member subject to strain thereby transmitting strain from each infinitesimal part of the member to each infinitesimal part of the filament. Other details such as kinds and sizes of filament wire, cements, operating characteristics, etc. are more fully disclosed in my copending application and hence need not be described herein as they do not per se constitute a part of my present invention.

The use of such a fine wire filament permits the gauge to be intimately and easily associated with the surface of the test member and hence the gauges are extremely well adapted to be placed at widely varying positions on the structure under test with the result that they are sometimes under the influence of widely different temperatures as well as being subject to localized temperature fluctuations.

It is an object of my invention to provide an improved strain responsive means of the electrical resistance filament type that is adapted to compensate for changes in resistance that occur in the filament as a result of temperature changes, thereby to allow a strain reading to be obtained independently of temperature variations.

Another object is to provide an improved temperature compensating strain gauge that is relatively simple and economical in construction, operation and maintenance and that can be conveniently applied to the surface of a test member with ease and dispatch while at the same time obtaining a high degree of sensitivity, accuracy, freedom from hysteresis and a stable zero for either static or dynamic tests.

Other objects and advantages will be more apparent to those skilled in the art from the following description of the accompanying drawing in which.

Figure 1:
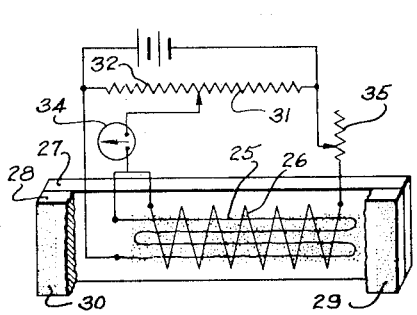
Fig. 1 is a diagrammatic arrangement of one form of my improved strain measuring means for eliminating temperature effects and for obtaining a high degree of sensitivity.

Temperature variations in the strain sensitive filament of the type of gauge disclosed herein arise from either electrical heating or to atmospheric or other external conditions which may, under certain special circumstances, seriously affect the precision, operation and results of this type of gauge unless suitable temperature compensation is obtained. To eliminate such adverse conditions, I employ as shown in Fig. 1 two filaments 25 and 26 insulated from each other and suitably cemented throughout their effective length to a nonconducting carrying means such as paper or other suitable insulating material or, if desired, the filaments may be sandwiched between and cemented to two sheets or slabs to be presently described. However, it is sometimes desirable to have a gauge which is stiff enough to act properly when fixed only at its ends. To this end there is specifically shown a pair of small slabs 27 and 28 between which the two filaments are firmly held. The two slabs are secured to each other and, in turn, have only their end portions generally indicated by the stippled areas 29 and 30 cemented or otherwise suitably affixed to the specimen surface by a screw or spot welding. The filament 25 extends in the direction of strain to be measured and therefore constitutes the strain responsive filament, whereas the filament 26 extends preferably in a direction crosswise of the strain filament 25 so that it is not subject to the longitudinal strains to which filament 25 is subjected. Hence the electrical resistance of filament 26 will vary only in accordance with changes in strain induced by temperature variations. However, these same temperature variations will equally affect the strain filament 25 and by suitably connecting these two filaments into a measuring circuit the temperature effects are cancelled out. One form of measuring circuit can be the well-known Wheatstone bridge in which the filaments 25 and 26 comprise two arms while resistors 31 and 32 comprise the other two arms. The galvanometer 34 or equivalent device serves as the bridge indicator.

If the filaments 25 and 26 are chosen so that their thermal coefficients of resistance are equal, then the effect of temperature upon the balance of the Wheatstone bridge is completely eliminated, provided that the slabs 27 and 28 have the same thermal coefficient of expansion as that of the material upon which the gauge is mounted; if not, then the bridge will be unbalanced only by the small amount that is due to the expansion or contraction of the gauge due to temperature. If the foregoing condition of equality is not exactly fulfilled, then a compensating resistance 35 may be placed in the bridge circuit external to the strain gauge in order to bring about said equality. In this manner, even a small unbalance due to differential thermal expansion may also be eliminated. This compensating arrangement of employing an additional filament such as 26 disposed transversely of and insulated from the longitudinal strain filament together with the bridge connections for the two filaments as shown in Fig. 1 may be employed with any of the other filament arrangements shown herein.

Beside eliminating temperature effects, the arrangement of cementing only the ends of the filament support or slab shown in Fig. 1 has the advantage that additional sensitivity is obtained in that while filament 25 increases in resistance the filament 26 will decrease and vice versa due to the well-known lateral effect of Poisson. For example, if the slab 29 were cemented down all over its length the lateral contraction of the gauge when it is stretched longitudinally would be restricted or prevented by cementing. In fact, if any strains existed at right angles to the gauge axis they would be transmitted to filament 26 unless only the ends are fixed down. Of course, the slab may be cemented down over its whole length whenever the lateral strain is known to be zero or when its relation to the longitudinal strain is known, either by theory or by another strain gauge.

Figure 2:
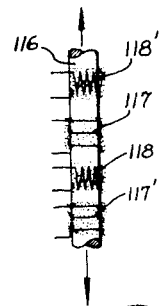
Fig. 2 is a diagrammatic illustration showing an application of my improved strain gauge to a test member for eliminating temperature effects.
Figure 3:
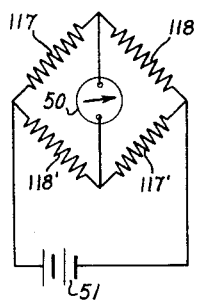
Fig. 3 is a diagram of a bridge circuit.

In the arrangement of Fig. 2 a specimen 116, subjected to either tension or compression, has filaments 117, 117', 118 and 118'. The filaments 117 and 117' extend circumferentially around the member 116, that is, in a direction transverse of the axial direction of such member. The filaments 118 and 118' extend axially of member 116 and also continuously around the same, specifically by being laid in a zigzag or grid form. This combined arrangement of transverse and axial filaments has the advantage that it may be used to give automatic temperature compensation by measuring the relation or differential changes in the two filaments as previously described for Fig. 1. This arrangement is equally suitable to a specimen or other member having more than two different cross-sectional areas one of which is provided with filament 117 and the other of which is provided with a filament such as 118. If desired, any number of duplicated filaments may be placed upon the specimen or members 116 to increase the sensitivity of the apparatus. For example, if the pair of filaments 117 and 118 shown in Fig. 2 is duplicated on the member 116 as indicated by filaments 117' and 118', then the four filaments can constitute elements of an electrical responsive circuit, specifically as arms of a Wheatstone bridge, Fig. 3. All four strain filaments will undergo changes in resistance in response to the load or force applied to the member, the filaments 118 and 118' being responsive to axial strain and the filaments 117 and 117' being responsive to lateral strain which is the result of the Poisson effect. Hence, the sensitivity of the device will be greatly increased. I have often employed this arrangement with all four bridge arms constituting active strain and temperature filaments because of the economy achieved and the stability from temperature effects as well as increased sensitivity and simplicity of the external circuit. Fig. 3 illustrates how all four bridge arms may be active. Duplicate temperature compensating filaments 117 and 117' would respectively constitute one pair of opposed arms while duplicate strain filaments 118 and 118' respectively constitute the other opposed arms. Any change in load of member 116 will cause a change in resistance of strain filaments 118 and 118' and an opposite change in filaments 117 and 117' thereby causing galvanometer 50 to swing accordingly. Any temperature change which may occur will similarly affect all four filaments which preferably are all identical in material and hence the temperature effects will be entirely cancelled thereby allowing the galvanometer 50 to be responsive only to strain. A battery 51 energizes the bridge. Furthermore, the arrangement of Fig. 2 has the advantage of utilizing the lateral effect of Poisson in the same manner as previously described in connection with Fig. 1. For instance, additional sensitivity is obtained for the reason that when filaments 118 and 118' increase in resistance under a tension load on specimen 116 the resistances of filaments 117 and 117' will decrease due to the lateral effect of Poisson and vice versa when the specimen is subjected to compression.

From the foregoing disclosure, it is seen that I have provided a very convenient, compact and yet highly effective temperature compensated strain gauge.

It will of course be understood that various changes in details of construction and arrangement of parts may be made by those skilled in the art without departing from the spirit of the invention as set forth in the appended claims.

I claim:

1. A strain responsive apparatus comprising, in combination, a member adapted to be strained, a plurality of filaments formed of material whose electrical resistance varies in accordance with strain thereof, means for bonding said plurality of filaments throughout their effective lengths to said member with said filaments being so disposed with respect to said member that the strain of at least one of the filaments is influenced by the Poisson effect in said member, and means commonly controlled by said plurality of filaments in response to the relative changes in resistances of the filaments.

2. A strain responsive apparatus comprising, in combination, a member adapted to be strained, a plurality of filaments formed of material whose electrical resistance varies in accordance with strain thereof, means for bonding said plurality of filaments throughout their effective lengths to said member with said filaments being so disposed with respect to said member that the strain of at least one of the filaments is influenced by the Poisson effect in said member, and an electrical circuit in which said filaments are so located therein that sensitivity of the circuit is influenced by relative changes in the resistances of the filaments.

3. The combination set forth in claim 2 further characterized in that the electrical circuit is a bridge and the plurality of filaments consists of at least four filaments with at least two of the filaments influenced by the Poisson effect in said member, and said latter filaments being respectively disposed in two of the opposed arms of the bridge while the remaining filaments are respectively disposed in the other two opposed arms of the bridge.

4. A strain responsive apparatus comprising, in combination, a member adapted to be strained, a plurality of filaments formed of material whose electrical resistance varies in accordance with strain thereof, means for bonding certain of said filaments throughout the effective length thereof to said member so as to extend in a substantially axial direction on said member, means for bonding the other of said filaments throughout the effective length thereof to said member so as to extend in a direction substantially transverse to the axial direction on said member, whereby said axially and transversely directed filaments are respectively subjected to strains in opposite senses as a result of the Poisson effect in the member, an electrical circuit, and said filaments in addition to extending in their axial and transverse directions are additionally positioned on the member in a predetermined manner about its axis and so located in said circuit that it responds to the average axial strain of said member.

5. The combination set forth in claim 4 further characterized in that the additional positioning of the filaments consists in having the transversely extending filament wrapped around the member and in having the axially extending filament placed on the member in grid form continuously around its axis.

6. A strain responsive apparatus comprising, in combination, a member adapted to be strained, a plurality of filaments formed of material whose electrical resistance varies in accordance with strain thereof, means for bonding certain of said filaments throughout the effective length thereof to said member so as to extend in a substantially axial direction on said member, means for bonding the other of said filaments throughout the effective length thereof to said member so as to extend in a direction substantially transverse to the axial direction on said member, whereby said axially and transversely directed filaments are respectively subjected to strains in opposite senses as a result of the Poisson effect in the member, an electrical circuit, and said filaments in addition to extending in their axial and transverse directions are additionally positioned in a predetermined manner about its axis and so located in said circuit that the circuit responds to the average axial strain of said member and compensates for temperature variations to which the filaments are commonly subjected.

7. A strain responsive apparatus comprising, in combination, a continuous solid filament of material whose electrical resistance varies in accordance with strain therein, opposed members between which said filament is sandwiched and to which said filament is bonded throughout its effective length to form a unitary strain responsive device that is adapted to be bonded to a member subject to strain throughout the effective length of said filament.

ARTHUR C. RUGE.